(12) United States Patent
Franzen et al.

(10) Patent No.: US 8,517,192 B2
(45) Date of Patent: Aug. 27, 2013

(54) DUAL MAST ARRANGEMENT FOR A CRANE

(75) Inventors: Hermann Franzen, Mönchengladbach (DE); Armin Wieschemann, Oberhausen (DE)

(73) Assignee: Gottwald Port Technology GmbH, Duesseldorf (DE)

( * ) Notice: Subject to any disclaimer, the term of this patent is extended or adjusted under 35 U.S.C. 154(b) by 288 days.

(21) Appl. No.: 13/062,112

(22) PCT Filed: Aug. 25, 2009

(86) PCT No.: PCT/EP2009/060905
§ 371 (c)(1),
(2), (4) Date: Mar. 3, 2011

(87) PCT Pub. No.: WO2010/026076
PCT Pub. Date: Mar. 11, 2010

(65) Prior Publication Data
US 2011/0163058 A1    Jul. 7, 2011

(30) Foreign Application Priority Data
Sep. 6, 2008  (DE) .......................... 10 2008 046 154

(51) Int. Cl.
*B66C 17/00*  (2006.01)
(52) U.S. Cl.
USPC ............ 212/319; 212/316; 212/327; 414/399
(58) Field of Classification Search
USPC ......... 212/312, 315, 316, 317, 319, 320–323, 212/324, 326, 327, 328, 330, 331, 332, 333, 212/334; 414/340, 342, 399, 460
See application file for complete search history.

(56) References Cited

U.S. PATENT DOCUMENTS 3,536,351 A * 10/1970 Zweifel et al. ............... 294/81.1
3,812,987 A   5/1974 Watatani
3,891,100 A   6/1975 Tamaki et al.
(Continued)

FOREIGN PATENT DOCUMENTS

DE   2352176 A1   5/1974
DE  19700469 A1   7/1998
(Continued)

OTHER PUBLICATIONS

English translation of the International Preliminary Examination Report for International Application No. PCT/EP2009/060905.
(Continued)

*Primary Examiner* — Emmanuel M Marcelo
*Assistant Examiner* — Angela Caligiuri
(74) *Attorney, Agent, or Firm* — Gardner, Linn, Burkhart & Flory, LLP

(57) ABSTRACT

A bridge or gantry crane, in particular for handling ISO containers, includes a crane cart that can move along a crane support in the direction of travel of the cart. The cart supports at least one mast that can move in a vertical lift and lowering direction, and a load supporting means for containers being suspended at the mast. In order to optimize the handling rate of a bridge or gantry crane, at least one second mast is provided including a second load supporting means disposed behind and at a distance from a first mast as seen in the direction of travel (K) of the cart.

11 Claims, 8 Drawing Sheets

(56) References Cited

U.S. PATENT DOCUMENTS

| | | | |
|---|---|---|---|
| 5,183,305 A * | 2/1993 | Nordstrom et al. | 294/81.2 |
| 5,718,550 A | 2/1998 | Lanigan, Sr. et al. | |
| 5,775,866 A * | 7/1998 | Tax et al. | 414/140.3 |
| 5,915,906 A | 6/1999 | Luecking et al. | |
| 6,698,990 B1 * | 3/2004 | Dobner et al. | 414/139.9 |
| 7,004,338 B2 | 2/2006 | Franzen et al. | |
| 2006/0043748 A1 * | 3/2006 | Stinis et al. | 294/81.51 |

FOREIGN PATENT DOCUMENTS

| | | |
|---|---|---|
| EP | 1365984 B1 | 3/2005 |
| EP | 1939131 A2 | 7/2008 |
| JP | 61248826 | 11/1986 |
| WO | 9532146 A1 | 11/1995 |
| WO | 0162656 A2 | 8/2001 |

OTHER PUBLICATIONS

International Search Report and Written Opinion of the International Searching Authority from corresponding Patent Cooperation Treaty (PCT) Application No. PCT/EP2009/060905, mailed Dec. 28, 2009.

International Preliminary Report on Patentability from corresponding Patent Cooperation Treaty (PCT) Application No. PCT/EP2009/060905 mailed Sep. 29, 2010.

* cited by examiner

DUAL MAST ARRANGEMENT FOR A CRANE

CROSS REFERENCE TO RELATED APPLICATION

The present application claims the priority benefits of International Patent Application No. PCT/EP2009/060905, filed on Aug. 25, 2009, which is hereby incorporated herein by reference in its entirety.

BACKGROUND OF THE INVENTION

The invention relates to a bridge or gantry crane having a crane trolley which can be moved along a crane carrier in the trolley travel direction and which supports at least one mast which can be moved in a vertical raising and lowering direction and on which a load-receiving means for containers is suspended and, in particular, to such a bridge or gantry crane for handling ISO containers.

European patent EP 1 365 984 B1 discloses a bridge or gantry crane for stacking containers, in particular ISO containers, which, within a container terminal, places containers into storage in a storage area or removes them from storage therein. Within the storage area the containers are set down on a rectangular store floor in rows and columns and up to four containers are stacked one on top of another. Within the storage area the set-down containers have their longitudinal extension aligned with the longitudinal direction of the storage area and, for example, ten containers are set down next to each other across the width of the storage area and narrowly spaced apart from each other. The bridge or gantry crane has a crane carrier which substantially spans the cuboidal storage area widthwise, on which the crane carrier and in the longitudinal direction thereof a crane trolley can travel. When the bridge or gantry crane is formed as a bridge crane, the crane carrier has, on each of its opposite ends, at least one running gear, by means of which the crane carrier can travel along rails. In accordance with the construction of a bridge crane the rails are elevated for this purpose by means of vertical supports which are disposed laterally next to the storage area and are anchored in the floor. The bridge crane is therefore able to travel in the longitudinal direction of the storage area by means of the running gears of the crane carrier and is able to travel transverse thereto by means of the crane trolley which can travel on the crane carrier. When the bridge or gantry crane is formed as a gantry crane, the rails for the crane carrier are disposed on the floor laterally adjoining the storage area and the running gears of the crane carrier are connected to the ends of the crane carrier via vertical supports.

In order to be able to handle the containers by means of the crane trolley, the crane trolley is provided with a mast which can be raised or lowered and is guided in the vertical direction. The mast is formed as a box girder and hoisting mechanisms are arranged on the crane trolley for the raising and lowering movement of the mast. A load-receiving means for containers, in particular a so-called spreader, is suspended on the lower end of the mast which is oriented in the direction of the containers to be handled. The use of a rigid mast between the crane trolley and the load-receiving means makes it possible to handle the containers with a low level of swinging in contrast to load-receiving means which are also used suspended on cables.

European patent application EP 1 939 131 A2 discloses a container bridge with a crane trolley, which crane trolley has two cable-winding mechanisms one behind the other when seen in the trolley travel direction, on which cable-winding mechanisms a twin load-receiving means for two ISO containers is suspended by hoisting cables. The individual load-receiving means, however, are connected to each other via hydraulic cylinders, which are oriented substantially horizontally and in the trolley travel direction, in order to be able to adjust the spacing between the individual load-receiving means. In a corresponding manner, the load-receiving means cannot be moved independently of each other in the hoisting and steering direction.

Furthermore, the patent document U.S. Pat. No. 5,718,550 A discloses a gantry crane for handling containers, which in a conventional manner has a horizontal crane carrier which carries a first crane trolley and a second crane trolley in front of, or behind, it as seen in the trolley travel direction. Each of the two crane trolleys has a hoisting mechanism on which a spreader frame is attached via cables in order to receive the containers to be handled. These spreader frames are formed in such a way that they can transport two or three containers at the same time in order thereby to increase the handling capacity. The first crane trolley and the second crane trolley each therefore support only a single load-receiving means, which is suspended via cables on a single hoisting mechanism, and are able to travel along the crane carrier independently of each other.

SUMMARY OF THE INVENTION

The present invention optimizes the handling capacity of a bridge or gantry crane.

A bridge or gantry crane for handling ISO containers, according to an aspect of the invention, includes a crane trolley which can be moved along a crane carrier in the trolley travel direction. The crane trolley supports at least one mast which can be moved in a vertical raising and lowering direction and on which a load receiver is suspended. The crane trolley supports a first mast with a first load receiver and supports at least one second mast with a second load receiver. The at least one second mast is disposed behind and spaced apart from the first mast in a trolley travel direction (K).

In accordance with an embodiment of the invention in the case of a bridge or gantry crane, in particular for handling ISO containers, having a crane trolley which can be moved along a crane carrier in the trolley travel direction and which supports at least one mast which can be moved in a vertical raising and lowering direction and on which a load-receiving means for containers is suspended, optimisation of the handling capacity is achieved in that at least one second mast with a second load-receiving means is disposed behind and spaced apart from a first mast when seen in the trolley travel direction. Therefore, two containers can be transported with one travelling movement of the crane trolley along the crane carrier. A common crane trolley may be provided.

Provision may be made for the first mast and the at least one second mast to be spaced apart from each other in such a way that respective containers can be handled independently of each other in relation to the movement in the raising and lowering direction by the first load-receiving means disposed on the first mast and by the second load-receiving means disposed on the at least one second mast. In this way, the containers can be handled in synchronism or in succession or one of the two masts can remain in a raised inoperative position. Travelling movements of the crane trolley to align the load-receiving means in relation to the containers between the individual handling processes are also possible.

Provision may also be made so that the first mast can be raised and lowered via a first hoisting mechanism and that the at least one second mast can be raised and lowered via a second hoisting mechanism. Provision can also be made for the first and second mast to be guided via first upper and lower guide elements and via second upper and lower guide elements respectively on the crane trolley.

The crane carrier can also be made up of a first carrier and a second carrier, on which trolley rails are disposed on which the crane trolley is able to travel in the trolley travel direction, and the first carrier and the second carrier are spaced apart from each other in the crane travel direction which is at right angles to the trolley travel direction.

In one embodiment, a first mast and a second mast are disposed on a common crane trolley. The existence of two masts permits an increase in the handling capacity while at the same time leading to only a small increase in the construction width of the bridge and gantry crane when seen in the longitudinal direction of the container store.

In order to effectively minimise or prevent lateral swinging of the containers, the first mast and the second mast may each be formed of one piece and are rigid. A telescoping mast is not deemed to be "of one piece" in the sense of this definition as a number of telescope sections are provided.

These and other objects, advantages and features of this invention will become apparent upon review of the following specification in conjunction with the drawings.

BRIEF DESCRIPTION OF THE DRAWINGS

An exemplified embodiment of the invention is described hereinunder and illustrated in the drawing in which.

DESCRIPTION OF THE PREFERRED EMBODIMENT

Figure 1:
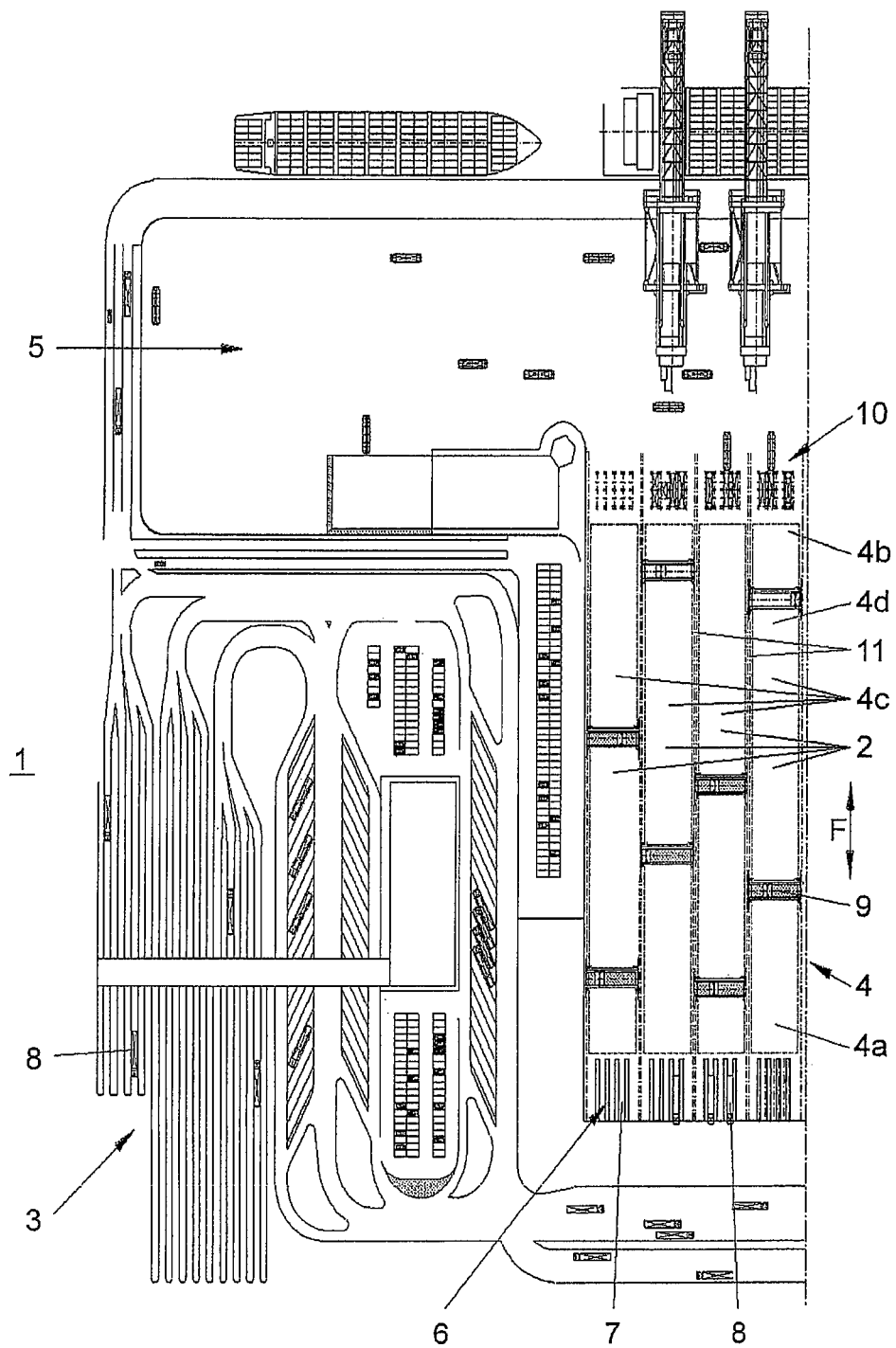
FIG. 1 is a top plan view of a handling installation for ISO containers in a port area.

Referring now specifically to the drawings, and the illustrative embodiments depicted therein, FIG. 1 shows an overview plan of a handling installation 1 in a port area in which containers 2, in particular International Organization for Standardization (ISO) intermodal containers, are handled. The overview plan shows only a section of the handling installation 1 but the essential components thereof can be seen. The handling installation 1 includes a land-side handling area 3, a container store 4 and a water-side handling area 5.

The land-side handling area 3 adjoins a land-side end 4a of the container store 4 and has an adjoining loading and unloading area 6 with a plurality of parking spaces 7 disposed next to each other for lorries 8 which are to be loaded and unloaded. In the loading and unloading area 6 a lorry 8 parked in one of the parking spaces 7 is loaded and/or unloaded by a bridge or gantry crane 9 operating in the container store 4.

The container store 4 includes a plurality of container store areas 4c, which are disposed in rows and in parallel next to each other, to which respectively at their land-side end 4a a loading and unloading area 6 is allocated and at their water-side end 4b an area 10 is allocated where containers are placed into and removed from storage. Each container store area 4c is allocated one or a plurality of bridge or gantry cranes 9 which can travel along the container store areas 4c on rails 11 in the crane travel direction F. The containers 2 are transported by the bridge or gantry crane 9 between the container store area 4c and the loading and unloading area 6 or the area 10 where containers are placed into and removed from storage. In addition to the one or the plurality of bridge or gantry cranes 9, each container store area 4c also has a set-down area 4d for the containers 2. The set-down area 4d has a rectangular base surface on which the containers 2 are disposed in rows and columns. In this case, up to five containers 2 are stored stacked one on top of the other. The set-down containers 2 are oriented with their longitudinal extension essentially in parallel with the rails 11 and therefore in the crane travel direction F of the bridge or gantry cranes 9. This orientation of the containers 2 is also found in the loading and unloading area 6 with the incoming and outgoing lorries 8 and in the area 10 where containers are placed into and removed from storage so that the respective bridge or gantry cranes 9 do not have to pivot the containers 2 apart from any necessary alignment corrections during pick-up and put-down.

At the water-side end 4b of the container store 4 the containers 2 are set down by the bridge or gantry crane 9 in the area 10 where containers are placed into and removed from storage, or are picked up therefrom. The area 10 where containers are placed into and removed from storage serves as an interface with respect to the water-side handling area 5.

Figure 2:
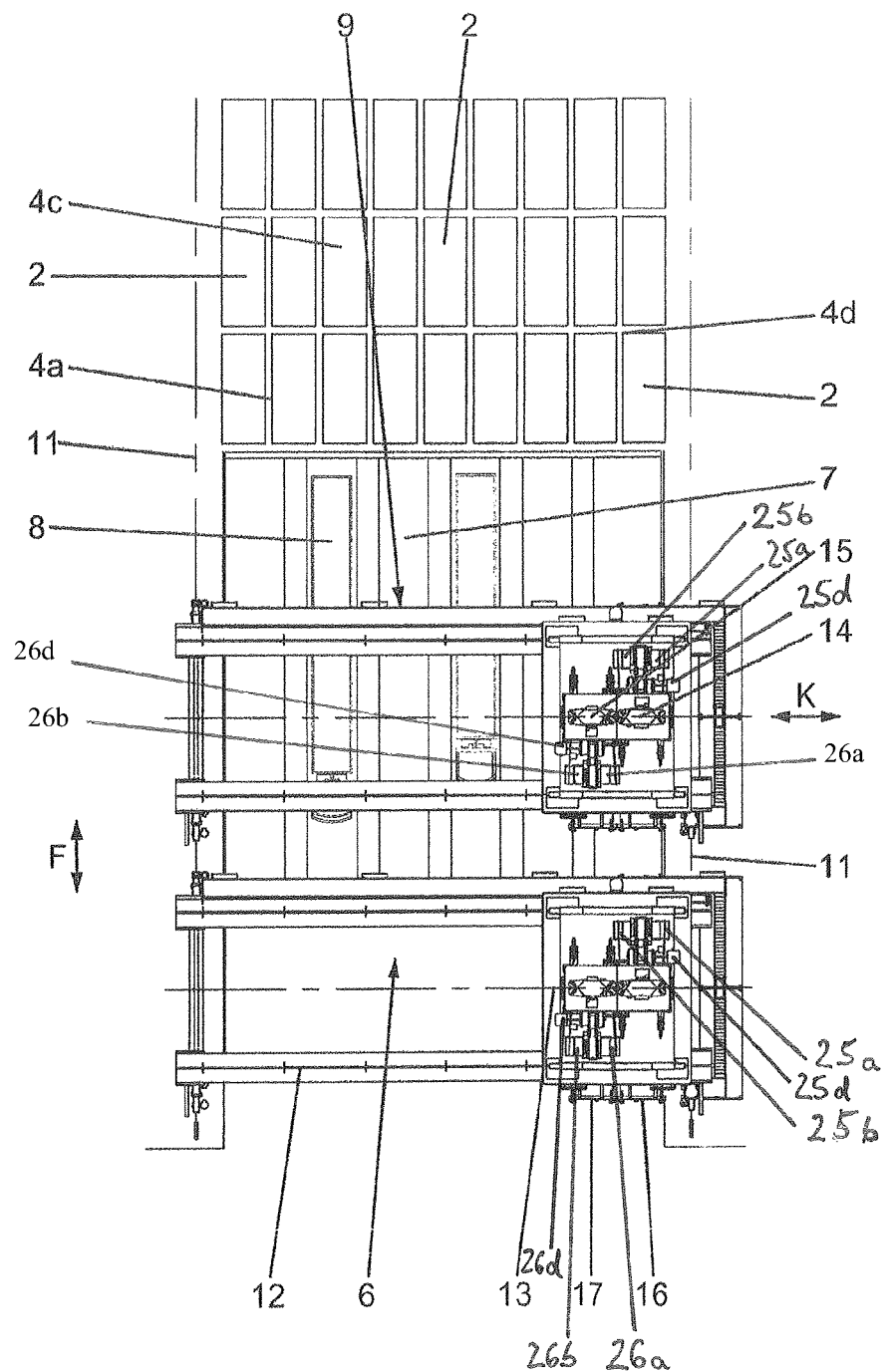
FIG. 2 is an enlarged portion of FIG. 1 from the region of a loading and unloading area of a container store of the handling installation.

FIG. 2 shows an enlarged section of FIG. 1 from the region of the loading and unloading area 6 and a part of an adjoining container store area 4c. It is clear that in each loading and unloading area 6 a plurality of parking spaces 7 for lorries 8 are disposed next to each other and with the smallest possible spacing with respect to each other. In a storage area 4c with nine rows of containers 2 set down next to each other, six parking spaces 7 for lorries 8 are provided next to each other.

The more detailed structure of the bridge or gantry crane 9, per se, is also clear from FIG. 2. This bridge or gantry crane 9 includes a crane carrier 12 which can travel in the crane travel direction F along the rails 11 which are disposed laterally next to the set-down areas 4d of the respective container store area 4c, on which crane carrier a crane trolley 13 can travel in the trolley travel direction K transverse to the travel direction F of the crane carrier 12. A first mast 14 and a second mast 15 are disposed in a mutually spaced manner on the crane trolley 13 one behind the other when seen in the trolley travel direction K. The first and the second mast 14, 15 are therefore suspended on a common crane trolley 13 and are therefore moved jointly along the crane carrier 12 by the crane trolley 13. Each of the two masts 14, 15 can be raised and lowered vertically and with respect to the crane trolley 13 in order to pick up and put down containers 2 by load-receiving means 16, 17, such as preferably a spreader frame, attached to the lower end 14a, 15a thereof (see FIG. 3). The first and second mast 14, are formed as rigid one-piece jibs, preferably in the form of box girders by means of which the load-receiving means 16, 17 are guided relative to the crane trolley 13. In this way lateral, i.e., horizontal, swinging movements of the load-receiving means 16, 17 with or without containers 2 are minimised or prevented. The first and second mast 14, 15 are not telescoped in the illustrated embodiment since the lateral stability would be diminished owing to the additional guides between the individual telescope sections then provided.

Figure 3:
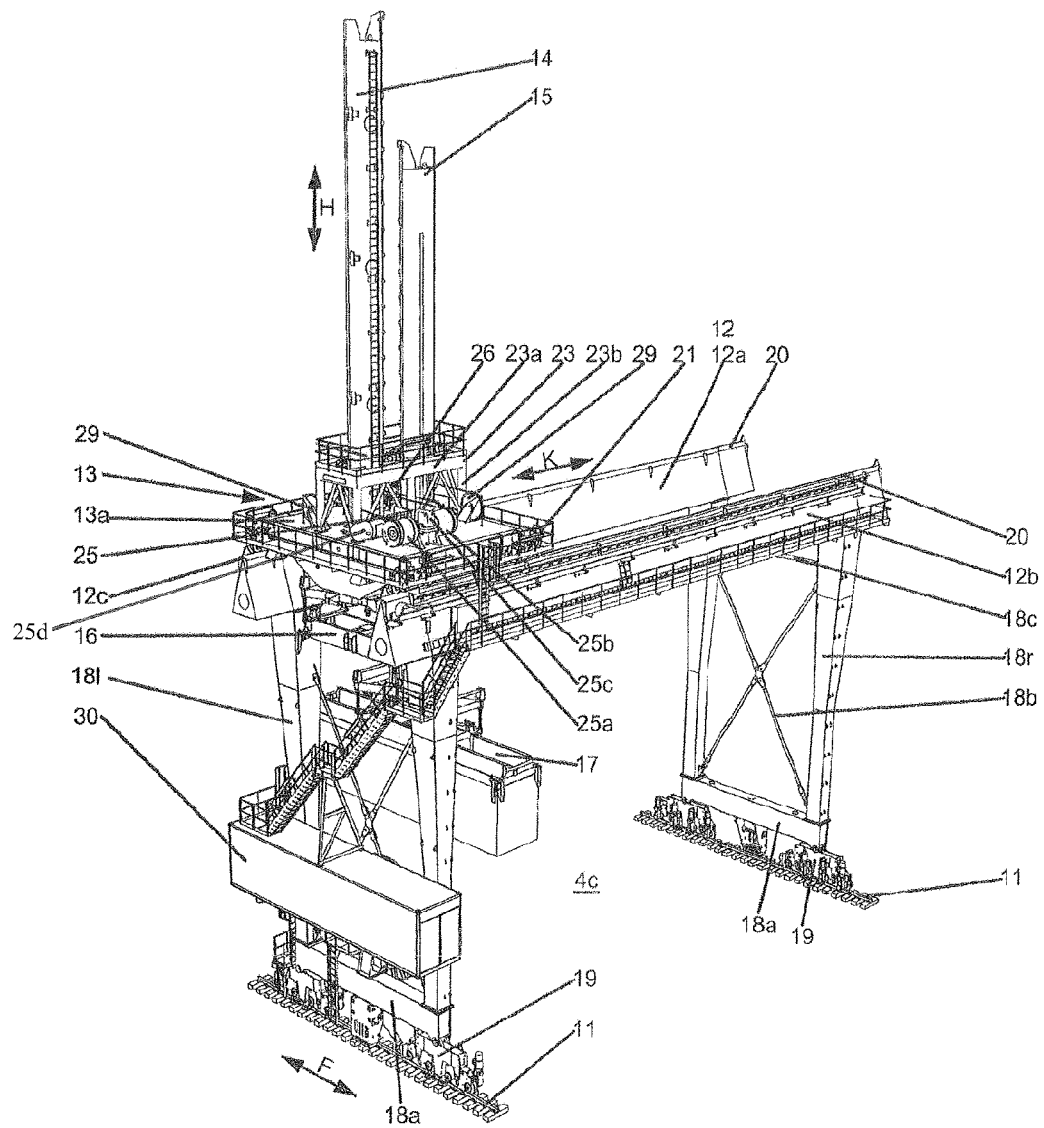
FIG. 3 is a perspective view of a bridge or gantry crane in accordance with the invention as shown in FIG. 2 when formed as a gantry crane.

FIG. 3 shows a perspective view of a bridge or gantry crane 9 in accordance with an embodiment as a gantry crane. For reasons of clarity, the container store area 4c is shown empty. The gantry crane 9 has a crane carrier 12, the opposite ends of which are supported via vertical supports 18l and 18r on the right and left when seen in the crane travel direction F. As a whole, the gantry crane is u-shaped when seen in the crane travel direction F and is open towards the bottom. The vertical supports 18l and 18r receive at their upper ends the crane carrier 12 in the opposite end regions thereof and are able to travel at their lower ends via crane running gears 19 on the rails 11 in the crane travel direction F. Furthermore, the crane carrier 12 is formed as a double carrier with a first carrier 12a and a second carrier 12b, which are disposed one behind the other when seen in the crane travel direction F and are disposed spaced apart one behind the other and at the same height. In a corresponding manner, the left vertical support 18l and the right vertical support 18r are also formed as double supports when seen in the crane travel direction F, which double supports are connected to each other by a base carrier 18a in the region of their lower end so as to form a u shape. The vertical supports 18l and 18r and the base carrier 18a which altogether form a u shape are additionally braced via rod-like main tensioning elements 18b. The main tensioning elements 18b are disposed in a cross-shape and are each disposed in the region of the upper and lower end on the left vertical supports 18l and the right supports 18r. An upper tensioning element 18c, which extends in parallel with the base carrier 18a and therefore substantially horizontally, is additionally provided above the cross-shaped main tensioning elements 18b.

FIG. 3 also shows that the first carrier 12a and the second carrier 12b each have a triangular cross-section. This triangular cross-section is in the shape of an isosceles triangle, wherein the angle in the region of the peak is about 30°. In the region of the peak 12c of the first carrier 12a and of the second carrier 12b a trolley rail 20 is attached in each case on which the crane trolley 13 can travel in the trolley travel direction K.

When seen in plan view, the trolley 13 includes a rectangular base frame 13a, in the four corners of which trolley running gears 21 are disposed which travel on the trolley rails 20. In the middle region of the base frame 13a of the crane trolley 13 are two openings through which the first mast 14 and the second mast 15 are guided. The first mast 14 and the second mast 15 are each guided via lower guide elements 32a into the base frame 13a (see FIG. 8). In addition, a table-like support structure 23 is positioned on the base frame 13, which structure is rectangular when seen in plan view and has an upper frame 23a which is supported on the upper side of the base frame 13 via six legs 23b. Upper guide elements 32b for the first mast 14 and the second mast 15 are located in the region of the upper frame 21a of the carrier structure 23 (see FIG. 8).

In order to move the first mast 14 and the second mast 15 in the raising and lowering direction H, a first hoisting mechanism 25 for the first mast 14 and a second hoisting mechanism 26 for the second mast 15 are disposed on the base frame 13a of the crane trolley 13. In a corresponding manner, the first and second mast 14, 15 can be moved in the raising and lowering direction H in a mutually independent manner. In FIG. 3, the first mast 14 is shown in its raised position. In contrast, the second mast 15 is located in a middle position. In this way, the first hoisting mechanism 25 and the second hoisting mechanism 26 are disposed on opposite sides of the base frame 13a. The first hoisting mechanism 25 and also the second hoisting mechanism 26, respectively, have a first cable drum 25a, 26a and a second cable drum 25b, 26b which are mounted coaxial to one another and on a common first transmission 25c and second transmission 26c, which are driven by a first drive motor 25d and a second drive motor 26d, respectively. Each of the four cable drums 25a, 25b, 26a and 26b has running from it in each case two first cables 27 and two second cables 28 so that four cables 27, 28 are provided per hoisting mechanism 25, 26 and either run directly from the cable drum 25a, 25b, 26a, 26b vertically downwards or are guided horizontally onto the opposite side of the first mast 14 and a second mast 15 and from there are deflected 90° vertically downwards via a deflecting roller 29 with a horizontal axis of rotation. The ends of the first cable 27 are connected to the first load-receiving means 16 and the ends of the second cable 28 are connected to the second load-receiving means 17.

Furthermore, FIG. 3 shows that on the outside of the left vertical supports 18l a container-like housing 30 is attached in which the control and power electrics or electronics for the bridge or gantry crane 9 are disposed.

Figure 4:
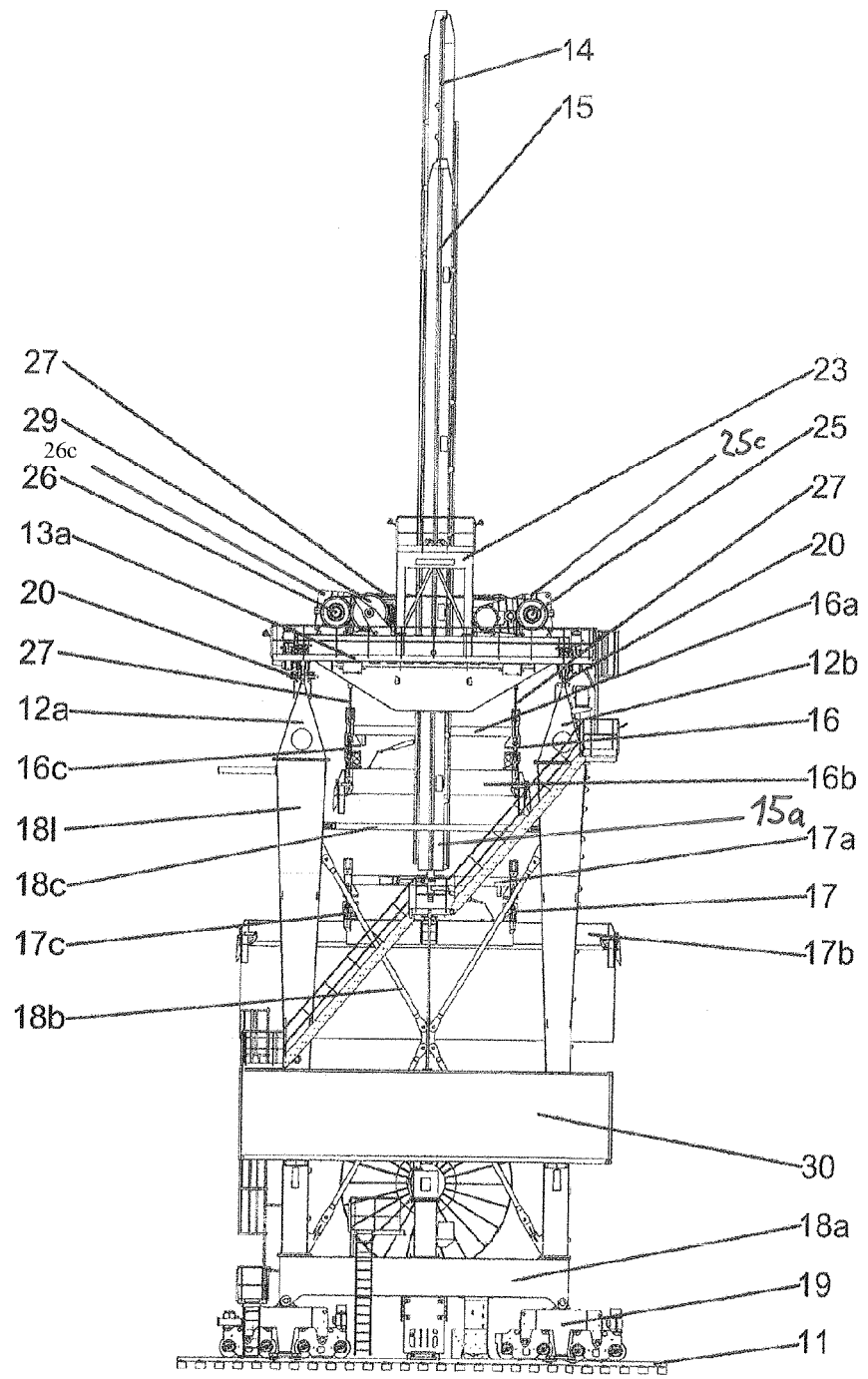
FIG. 4 is a side elevation of the bridge or gantry crane of FIG. 3.

FIG. 4 shows a side view of FIG. 3 and illustrates particularly well the universal attachment of the first load-receiving means 16 at the lower end 14a of the first mast 14 and of the second load-receiving means 17 at the lower end 15a of the second mast 15. The first load-receiving means 16 and the second load-receiving means 17 are distributed in the usual way in an upper first suspension frame 16a and an upper second suspension frame 17a and the actual first spreader frame 16b and second spreader frame 17b. The first suspension frame 16a and the second suspension frame 17a are each universally attached centrally on the upper end 14a of the first mast 14 and the lower end 15a of the second mast 15 and, when seen in plan view, have an essentially rectangular cross-section. In the respective corners of the first suspension frame 16a and of the second suspension frame 17a the four first cables 27 and the four second cables 28 are attached. For reasons of clarity, the second cables 28 have been omitted.

FIG. 4 clearly shows the first load-receiving means 16 located in its maximum raised position, which is a retracted position in relation to the length of the container 2, above the upper tensioning element 18c between the two left vertical supports 18l so that the crane trolley 13 with the load-receiving means 16 and its spreader frame 16b and without a container 2 conveyed thereby can travel over the upper tensioning element 18c.

Furthermore, FIG. 4 shows that the first cable 27 running from the first cable drum 25a upwards and horizontally in the direction of the first mast 14 is guided in the direction of a deflecting roller 29 mounted on the opposite side of the base frame 13a and is deflected vertically downwards through 90° by this deflecting roller out of its horizontal orientation. In a corresponding manner, the other first cables 27 and the second cables 28 are deflected so that a total of four deflecting rollers 29 are disposed on the base frame 13a.

In a conventional manner, the first spreader frame 16b and the second spreader frame 17b are respectively suspended via first chains 16c and second chains 17c on the first suspension frame 16a and the second suspension frame 17a.

Figure 5:
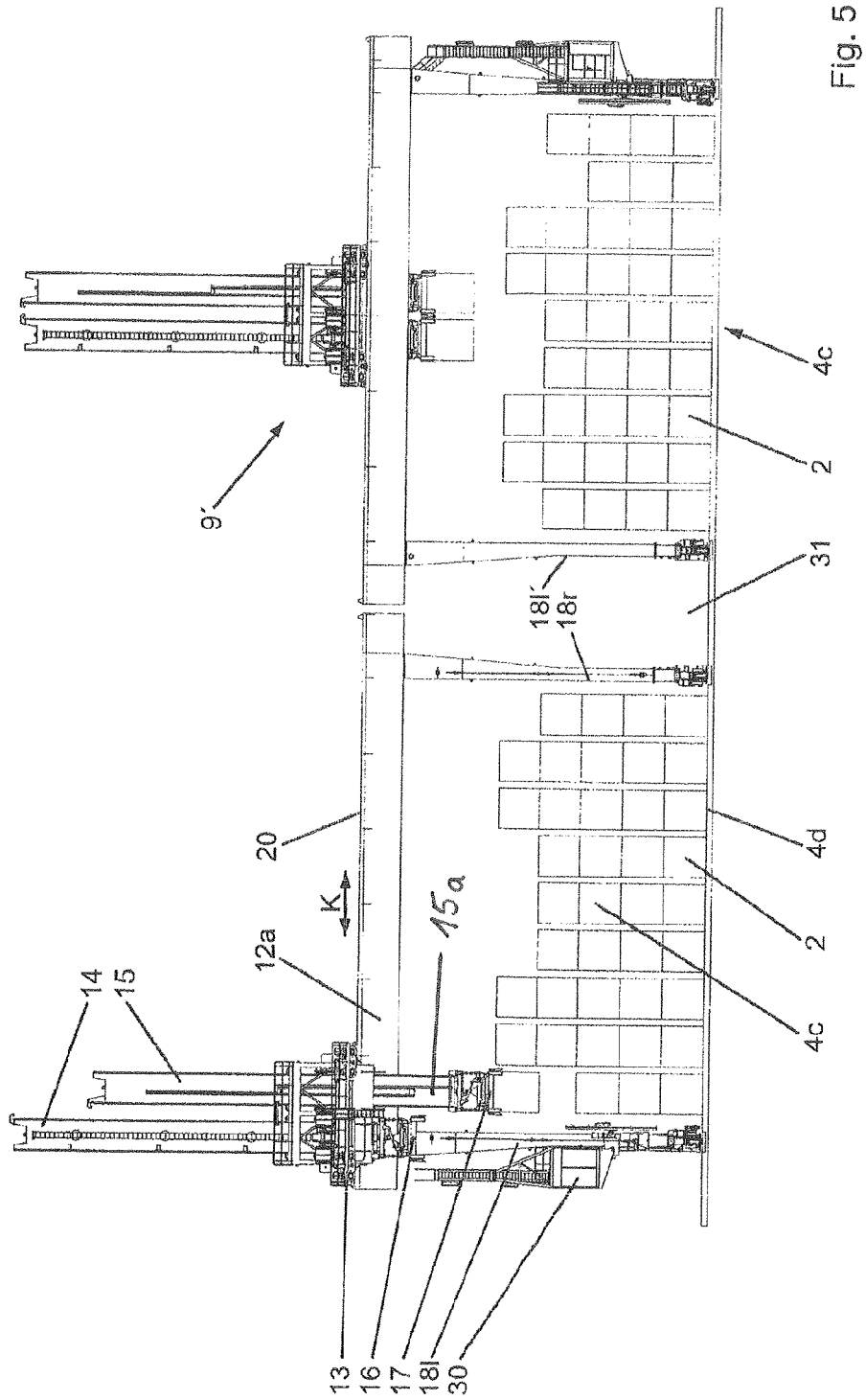
FIG. 5 is a front elevation of the bridge or gantry crane of FIG. 3 with a neighbouring further bridge or gantry crane.

FIG. 5 illustrates a front view of FIG. 3 with a further neighbouring bridge or gantry crane 9'. In this view, the container store area 4c is clearly shown with containers 2 stacked on top of one another. In each case, five containers are stacked one on top of another in the container store area 4c and are set down next to each other when seen in the trolley travel direction K and spaced about 40 cm apart from each other. In a corresponding manner, the first mast 14 and the second mast 15 are spaced apart from each other on the crane trolley 13 in the trolley travel direction K in such a way that the first load-receiving means 16 and the second load-receiving means 17, in particular the first spreader frame 16b thereof and the second spreader frame 17b thereof, are spaced apart from each other when seen in the trolley travel direction K in such a way that containers 2 can be picked up from the container store area 4c or set down therein by the first load-receiving means 16 and the second load-receiving means 17 in a synchronous or time-offset manner but at least partially simultaneously.

In relation to the first and last row of containers 2, as seen in the trolley travel direction K, provision is made for these containers to be reached by the first load-receiving means 16 and also the second load-receiving means 17 so that each container 2 can be set down by the first load-receiving means 16 or the second load-receiving means 17 at each location of the container store area 4c or can be picked up therefrom. For this purpose the first carrier 12a and the second carrier 12b have been extended laterally over the left vertical support 18l and the right vertical support 18r to such an extent that, when seen in relation to the right vertical support 18r, a raised second load-receiving means 17 can extend laterally out of the container store area 4d so that the first load-receiving means 16 can pick up or set down a container 2 even in the last row of containers, and the first load-receiving means 16 in the first row. A corresponding situation is shown in FIG. 5 in the case of the left-hand trolley 13.

It would also be feasible to lengthen the first carrier 12a and the second carrier 12b with the associated rails 20 only on the left-hand side, on which the housing 30 is disposed laterally next to the left-hand vertical support 18l. Corresponding lengthening on this side would not lead to an increase in the construction size of the bridge or gantry crane 9. If such lengthening is carried out on the right-hand side in relation to the right-hand vertical support 18r and corresponding lengthening also on a further parallel-disposed bridge or gantry crane 9', then between these vertical supports 18r, 18l' a region is produced which cannot be used for storing containers 2, but rather as a travel path 31, for example.

Figure 6:
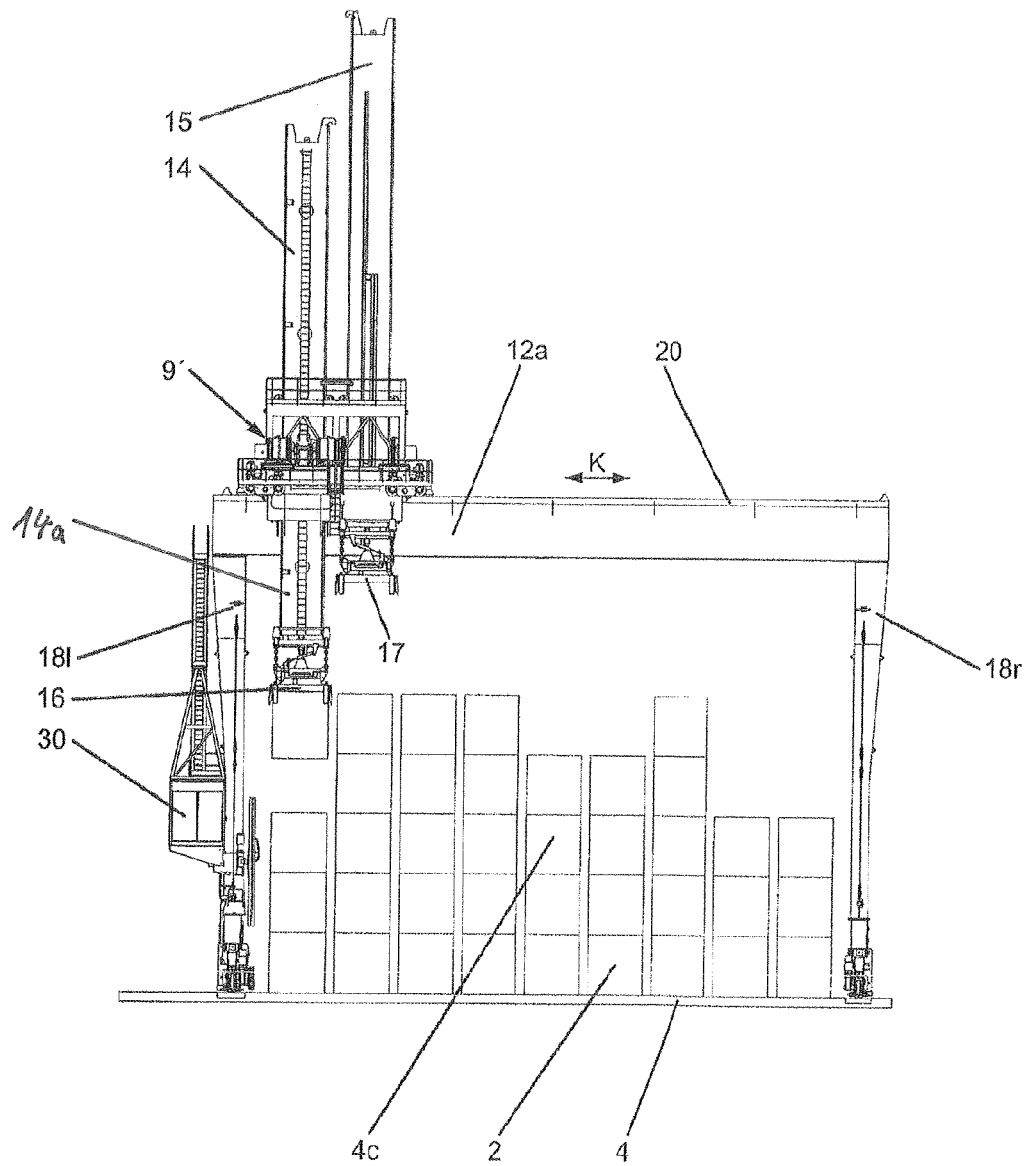
FIG. 6 is a front elevation of the bridge or gantry crane of FIG. 3 with a bridge or gantry crane having a crane carrier of an alternative length.

FIG. 6 shows a front view of FIG. 3 with a bridge or gantry crane 9 with the crane carrier 12 being of an alternative length. As already stated, it is also possible to allow the first carrier 12a and the second carrier 12b to end in the region of the lateral left-hand vertical support 18l and right-hand vertical support 18r. This means that the first and last rows of stacked containers 2, as seen in the trolley travel direction K, in the store area 4c can be served only by the first mast 14, which is at the front as seen in the trolley travel direction K, with the first load-receiving means 16 in relation to the first row of containers 2, and in relation to the last row of containers 2 only with the second mast 15, which is at the rear as seen in the trolley travel direction K, with the second load-receiving means 16.

Figure 7:
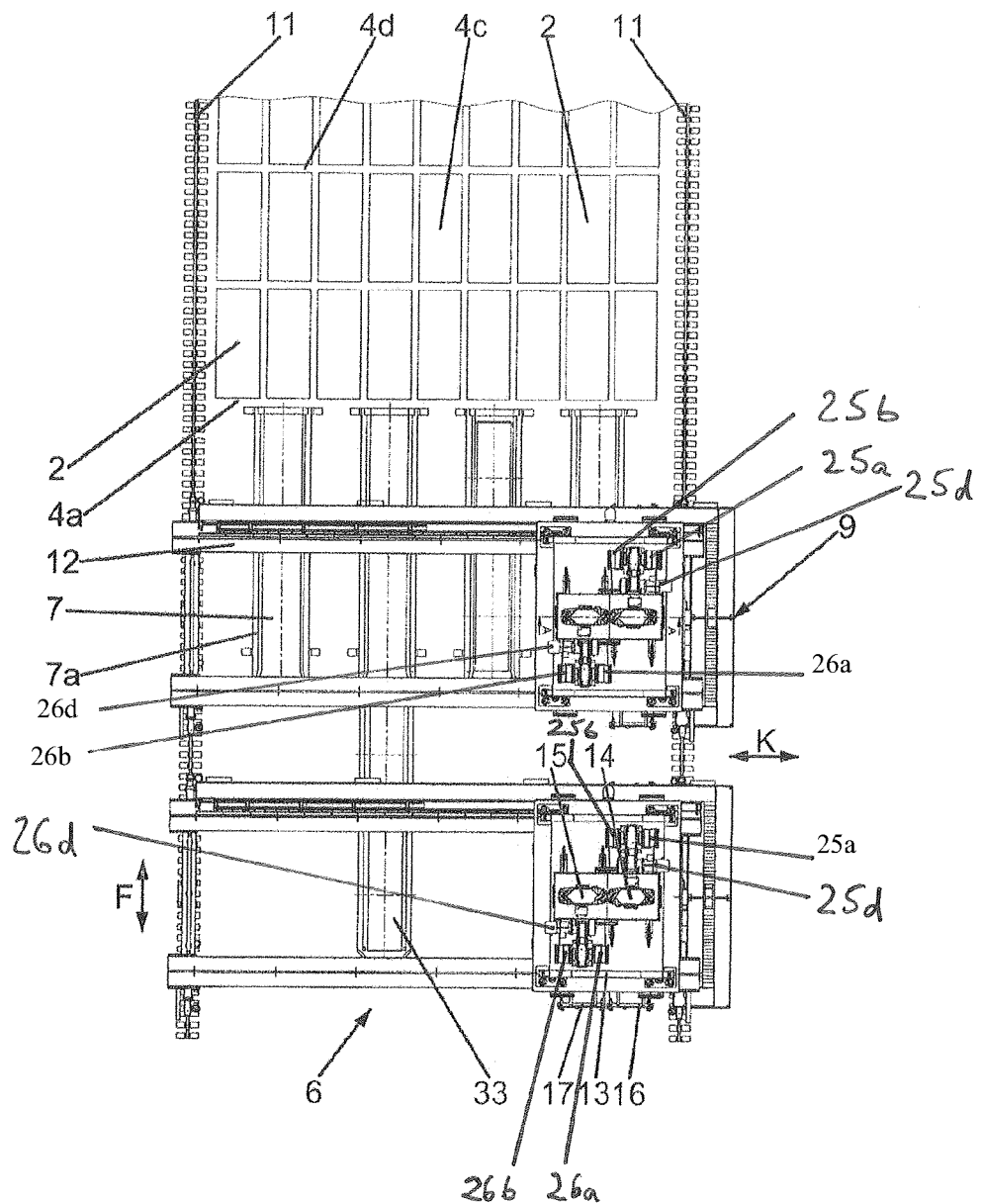
FIG. 7 is an enlarged portion of FIG. 1 from the region of an area of the handling installation where containers are placed into storage and removed from storage.

FIG. 7 shows an enlarged section of FIG. 1 from the region of a loading and unloading area 6 of a container store 4 of the handling installation 1 according to FIG. 1. From this figure, it is clear that in the area 6 in which containers are placed into and removed from storage a plurality of parking spaces 7 for automated guided vehicles 33 are disposed next to each other and with the smallest possible spacing from each other. The storage area 4c thus has nine rows of containers 2 set down next to each other, wherein four parking spaces 7 are provided therein for containers set down or picked up by automated guided vehicles 33. The parking spaces 7 for the containers 2 include stationary support frames 7a onto which the containers 2 can be set down or picked up by the bridge or gantry crane 9 or the automated guided vehicle 33. For this purpose, the support frames 7a are provided with set-down surfaces protruding laterally inwards as seen in the direction in which the automated guided vehicles 33 travel in and out, onto which set-down surfaces a container 2 raised by the automated guided vehicle 33 can be set down or picked up thereby.

Figure 8:
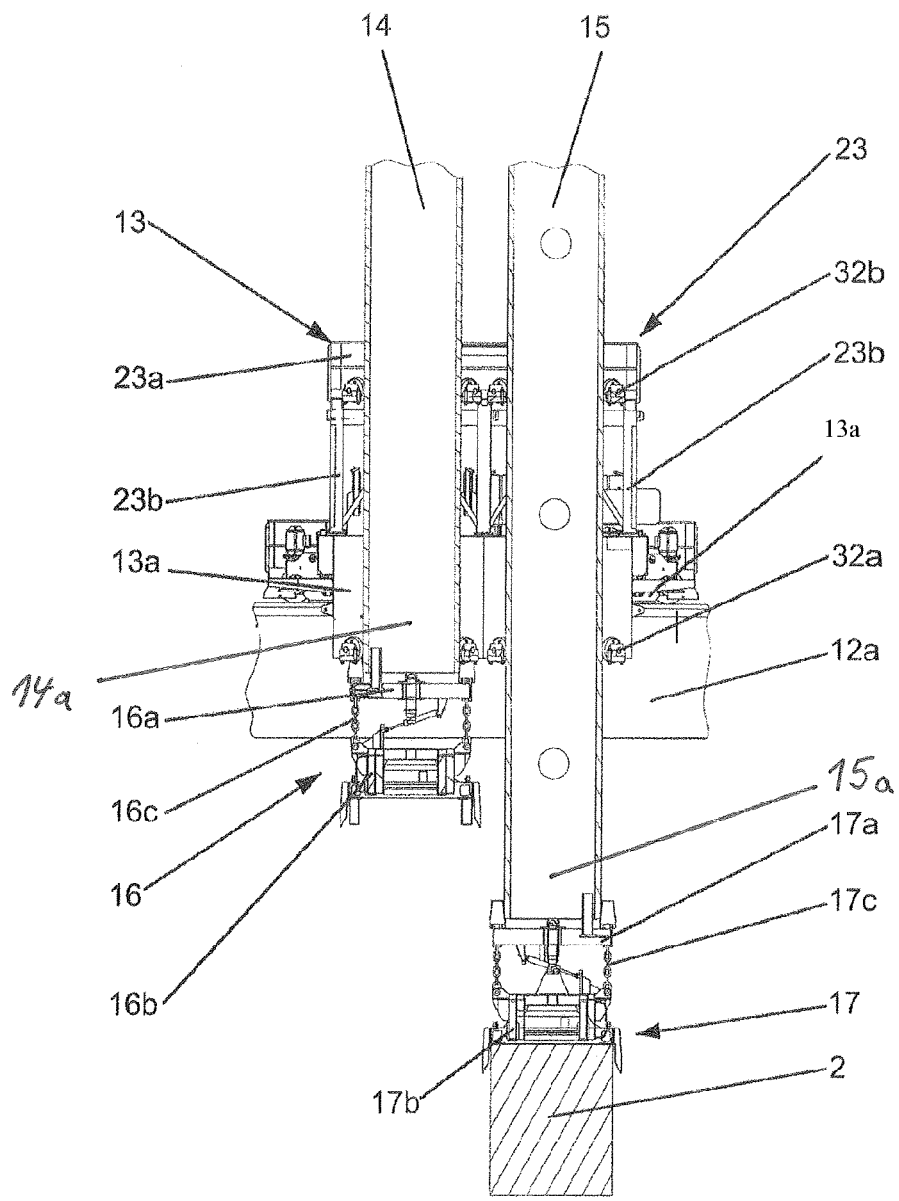
FIG. 8 is a cross-sectional view of a bridge or gantry crane as shown in FIG. 5 seen from the region of the crane trolley.

Furthermore, FIG. 8 shows a cross-sectional view of a bridge or gantry crane 9 according to FIG. 5 from the region of the crane trolley 13. From this side view it is particularly clear that the first mast 14 and the second mast 15 are respectively guided via lower guide elements 32a in the region of the base frame 13a of the crane trolley 13 and via upper guide elements 32b in the region of the upper frame 23a of the carrier structure 23. The lower and upper guide elements 32a and 32b are formed as guide rollers which guide the first mast 14 and the second mast 15 from four sides in each case and in an opposite manner.

The description relates to a bridge or gantry crane 9, 9' which is formed as a gantry crane. It is fundamentally also possible to form the bridge or gantry crane 9, 9' as a bridge crane with raised or elevated rails 11.

Changes and modifications in the specifically described embodiments can be carried out without departing from the principles of the invention which is intended to be limited only by the scope of the appended claims, as interpreted according to the principles of patent law including the doctrine of equivalents.

REFERENCE LIST

| | |
|---|---|
| 1 | handling installation |
| 2 | container |
| 3 | land-side handling area |
| 4 | container store |
| 4a | land-side end |
| 4b | water-side end |
| 4c | container store area |
| 4d | set-down area |
| 5 | water-side handling area |
| 6 | loading and unloading area |
| 7 | parking space |
| 7a | support frame |
| 8 | lorry |
| 9, 9' | bridge or gantry crane |
| 10 | area where containers are placed into or removed from storage |
| 11 | rails |
| 12 | crane carrier |
| 12a | first carrier |
| 12b | second carrier |
| 12c | peak |
| 13 | crane trolley |
| 13a | base frame |
| 14 | first mast |
| 14a | lower end of the first mast |
| 15 | second mast |
| 15a | lower end of the second mast |
| 16 | first load-receiving means |
| 16a | first suspension frame |
| 16b | first spreader frame |
| 16c | first chain |
| 17 | second load-receiving means |
| 17a | second suspension frame |
| 17b | second spreader frame |
| 17c | second chain |
| 18a | base carrier |
| 18b | main tensioning element |
| 18c | upper tensioning element |
| 18l, 18l' | left-hand vertical support |
| 18r | right-hand vertical support |
| 19 | crane running gears |

-continued

| | |
|---|---|
| 20 | trolley rail |
| 21 | trolley running gears |
| 22 | lower openings |
| 23 | support structure |
| 23a | upper frame |
| 23b | legs |
| 24 | upper openings |
| 25 | first hoisting mechanism |
| 25a | first cable drum |
| 25b | second cable drum |
| 25c | first transmission |
| 25d | first drive motor |
| 26 | second hoisting mechanism |
| 26a | first cable drum |
| 26b | second cable drum |
| 26c | second transmission |
| 26d | second drive motor |
| 27 | first cables |
| 28 | second cables |
| 29 | deflecting roller |
| 30 | housing |
| 31 | travel path |
| 32a | lower guide elements |
| 32b | upper guide elements |
| 33 | automated guided vehicle |
| F | crane travel direction |
| H | raising and lowering direction |
| K | trolley travel direction |

The invention claimed is:

1. Bridge or gantry crane for handling ISO containers, comprising:
a crane carrier that can be moved along rails in a crane travel direction (T);
a crane trolley which can be moved along said crane carrier in a trolley travel direction (K) and which supports a plurality of masts which can be moved in a vertical raising and lowering direction and on which a load receiver is suspended, wherein the crane trolley supports a first mast with a first load receiver and supports at least one second mast with a second load receiver, and the at least one second mast is disposed behind and spaced apart from the first mast in the trolley travel direction (K), wherein the first mast and the at least one second mast are spaced apart from each other in such a way that respective containers can be handled independently of each other in relation to the movement in a raising and lowering direction (H) by the first load receiver disposed on the first mast and by the second load receiver disposed on the at least one second mast.

2. The bridge or gantry crane as claimed in claim 1 including a first hoisting mechanism that is adapted to raise and lower the first mast and at least one second hoisting mechanism that is adapted to raise and lower the at least one second mast.

3. The bridge or gantry crane as claimed in claim 2 including first upper and lower guide elements that are adapted to guide the first mast on the crane trolley and second upper and lower guide elements that are adapted to guide the second mast on the crane trolley.

4. The bridge or gantry crane as claimed in claim 3, wherein the crane carrier includes a first carrier and a second carrier, on which trolley rails are disposed wherein the crane trolley is adapted to travel in the trolley travel direction (K) on the trolley rails, and wherein the first carrier and the second carrier are spaced apart from each other in a crane travel direction (F) which is at right angles to the trolley travel direction (K).

5. The bridge or gantry crane as claimed in claim 4, wherein the first mast and the second mast are each formed of one piece and are rigid.

6. The bridge or gantry crane as claimed in claim 2, wherein the crane carrier includes a first carrier and a second carrier, on which trolley rails are disposed wherein the crane trolley is adapted to travel in the trolley travel direction (K) on the trolley rails, and wherein the first carrier and the second carrier are spaced apart from each other in a crane travel direction (F) which is at right angles to the trolley travel direction (K).

7. The bridge or gantry crane as claimed in claim 1, wherein the crane carrier includes a first carrier and a second carrier, on which trolley rails are disposed wherein the crane trolley is adapted to travel in the trolley travel direction (K) on the trolley rails, and wherein the first carrier and the second carrier are spaced apart from each other in a crane travel direction (F) which is at right angles to the trolley travel direction (K).

8. The bridge or gantry crane as claimed in claim 7 including first upper and lower guide elements that are adapted to guide the first mast on the crane trolley and second upper and lower guide elements that are adapted to guide the second mast on the crane trolley.

9. The bridge or gantry crane as claimed in claim 8, wherein the first mast and the second mast are each formed of one piece and are rigid.

10. The bridge or gantry crane as claimed in claim 1 including first upper and lower guide elements that are adapted to guide the first mast on the crane trolley and second upper and lower guide elements that are adapted to guide the second mast on the crane trolley.

11. The bridge or gantry crane as claimed in claim 1, wherein the first mast and the second mast are each formed of one piece and are rigid.

* * * * *